(12) United States Patent
Gopalakrishnan

(10) Patent No.: US 7,526,719 B1
(45) Date of Patent: Apr. 28, 2009

(54) FILE FORMAT FOR TABLE STYLES

(75) Inventor: Sankarganesh Gopalakrishnan, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 758 days.

(21) Appl. No.: 11/086,805

(22) Filed: Mar. 21, 2005

(51) Int. Cl.
*G06F 17/00* (2006.01)

(52) U.S. Cl. .................................................. 715/227

(58) Field of Classification Search ................. 715/227, 715/228
See application file for complete search history.

(56) References Cited

U.S. PATENT DOCUMENTS

| | | | | |
|---|---|---|---|---|
| 5,138,697 A | * | 8/1992 | Yamamoto et al. | 345/420 |
| 5,623,282 A | * | 4/1997 | Graham et al. | 345/672 |
| 6,112,214 A | * | 8/2000 | Graham et al. | 715/212 |
| 6,625,499 B2 | * | 9/2003 | Abdalla | 700/25 |
| 6,671,701 B1 | * | 12/2003 | Chouinard | 707/201 |
| 6,728,733 B2 | * | 4/2004 | Tokui | 707/200 |
| 6,999,907 B2 | * | 2/2006 | Smith | 703/1 |
| 7,366,980 B2 | * | 4/2008 | Small | 700/192 |
| 2001/0007959 A1 | * | 7/2001 | Abdalla | 700/25 |
| 2002/0065849 A1 | | 5/2002 | Ferguson et al. | |
| 2003/0065662 A1 | * | 4/2003 | Cosic | 707/9 |
| 2003/0164817 A1 | * | 9/2003 | Graham et al. | 345/157 |
| 2004/0172589 A1 | * | 9/2004 | Small | 715/502 |
| 2004/0243929 A1 | * | 12/2004 | Jones et al. | 715/509 |
| 2004/0264811 A1 | * | 12/2004 | Yano et al. | 382/306 |
| 2005/0065966 A1 | * | 3/2005 | Diab | 707/102 |
| 2005/0071369 A1 | * | 3/2005 | Lang et al. | 707/103 R |

OTHER PUBLICATIONS

Shin et al., View Changes in Augmented Reality Computer-Aided Drawing, ACM 2005, pp. 1-14.*
Clark, Effective Tables and Figures, Google 1996, pp. 1-24.*
Whitton, Art; AutoCAD tutorials, Lesson 4, 1-11; Sep. 2004; myCADsite.com; pp. 1-4.
Parsai, A., AutoCAD 2005: Tables, p. 13, [retrieved from Internet on Jul. 6, 2007] http://www.cadpanel.com/tutorials/2005tables/040425tables2005.htm.
DotSoft—AutoCAD 2005 Review, p. 11, [retrieved from the Internet on Jun. 21, 2007] http://www.dotsoft.com/acad2005.htm.
CadDigest—Tables, p. 2 [retrieved from the Internet on Jun. 20, 2007] http://www.caddigest.com/subjects/autocad/tutorials/tables.htm.
MyCadSite—Free CAD Lesson 4-9 Creating and Working with Tables—AutoCAD 2005, p. 4, [retrieved from the Internet on Jun. 20, 2007] http://web.archive.org/web/20040925000330/www.we-r-here.com/cad/tutorials/level_4/4-9.htm.
MyCadSite—Free CAD Lesson 4-4 Autocad Files types—AutoCAD 2005, p. 3, [retrieved from the Internet on Jun. 21, 2007] http://www.we-r-here.com/cad/tutorials/level_4/4-4.

* cited by examiner

*Primary Examiner*—Cong-Lac Huynh
(74) *Attorney, Agent, or Firm*—Fish & Richardson P.C.

(57) ABSTRACT

Systems and methods are provided for formatting data. In one implementation, a system provided includes a device to persistently store a table style, the table style specifying properties inherited by a table object displayed in a computer-aided design program. The table object includes a title cell, header cells and data cells that each have properties and data. The table style includes an identifier to identify the table style that designates properties associated with the table object. Exemplary properties include a flow direction designator, horizontal spacing data, vertical spacing data, a first suppression flag, a second suppression flag, title cell properties, header cell properties, and data cell properties.

6 Claims, 9 Drawing Sheets

100

| Title | | |
|---|---|---|
| Header | Header | Header |
| Data | Data | Data |
| Data | Data | Data |
| Data | Data | Data |
| Data | Data | Data |
| Data | Data | Data |
| Data | Data | Data |
| Data | Data | Data |
| Data | Data | Data |

102 — Title
104 — Header
106 — Data

FIG. 1

FILE FORMAT FOR TABLE STYLES

CROSS-REFERENCE TO RELATED APPLICATIONS

This present application is related to U.S. patent application Ser. No. 11-086804, entitled "FILE FORMAT FOR TABLE OBJECTS" which is commonly assigned and filed concurrently herewith, and the contents of which are incorporated herein by reference in its entirety.

BACKGROUND

This disclosure relates to data structures and methods for formatting data.

Software applications such as computer-aided design software typically store data as files in a persistent memory device such as a hard disk. Data conventionally needs to be organized in persistent memory according to a specific format recognizable by a software application. During execution, data from files may be loaded into a volatile memory device such as random access memory (RAM). Data also conventionally needs to be organized in volatile memory according to a specific format in order for software-programs to execute instructions against the data. For example, some software programs read graphical primitives from particular locations in persistent memory to render a drawing.

Two types of file formats include .DWG and .DXF (Document eXchange Format). These file formats are compatible with computer-aided software such as AutoCAD® by Autodesk, Inc. of San Rafael, Calif. The .DWG format is a proprietary file format designed specifically for AutoCAD® and licensed third party software. The .DXF format is an open file format useful for transferring drawings between different computer-aided software programs.

One problem concerning file formats is that a lifecycle of the file format is often much longer than a lifecycle of a software product. Hence, there is no specific data structure or method for formatting data associated with new functionalities. That is, the software application may evolve over time, adding new constructs or formatting, and only new or later releases of a software application may be able to read and process a file in a given format.

SUMMARY

This disclosure generally describes data structures and methods for formatting data. In general, in one aspect, a system is provided. The system includes a device to persistently store a table style, the table style specifying properties inherited by a table object displayed in computer-aided design application, the table object including a title cell, header cells and data cells that each have properties and data, the table style including an identifier to identify the table style that designates properties associated with the table object; a flow direction designator to specify which direction the table object is organized; horizontal spacing data to specify spacing between horizontal gridlines of the table object and embedded data; vertical spacing data to specify spacing between vertical grid lines of the table object and the embedded data; a first suppression flag to indicate whether the title cell is displayed in the table object; a second suppression flag to indicate whether the header cells are displayed in the table object; title cell properties to specify properties associated with the title cell; header cell properties to specify properties associated with each header cell; and data cell properties to specify properties associated with each data cell.

Particular implementations can include one or more of the following features. The title cell properties can further include a title text style object to identify a text style for text in the title cell; title row height data can specify a font size for the text; and title row alignment data can specify positioning of the text. The title cell properties can further include title row foreground color data, title row background fill color data, and a flag to indicate if the background fill color needs to be applied to a title row. The header cell properties can further include a header title text style object to identify a text style for text in the header cells; header row height data to specify a font size for the text; and header row alignment data to specify positioning of the text. The header cell properties can further include a header row foreground color data, a header row background fill color data, and a flag to indicate if the background fill color needs to be applied to a header row.

The data cell properties can further include a data text style object to identify a text style for text in the data cells; data row height data to specify a font size for the text; and data row alignment data to specify positioning of the text. The data cell properties can further include data row foreground color data, data row background fill color data, and a flag to indicate if the background fill color needs to be applied to a data row. The title cell properties can further include first title line weight data to specify a thickness of a horizontal top gridline of the title cell, second title line weight data to specify a thickness of a horizontal inside gridline of the title cell, third title line weight data to specify a thickness of a horizontal bottom gridline of the title cell, fourth title line weight data to specify a thickness of a vertical left gridline of the title cell, fifth title line weight data to specify a thickness of a vertical inside gridline of the title cell, and sixth title line weight data to specify a thickness of a vertical right gridline of the title cell.

The title cell properties can further include first title line visibility flag data to specify if the horizontal top gridline of the title cell needs to be displayed, first title line color data to specify the color of the horizontal top gridline of the title cell, second title line visibility flag data to specify if the horizontal inside gridline of the title cell needs to be displayed, second title line color data to specify the color of the horizontal inside gridline of the title cell, third title line visibility flag data to specify if the horizontal bottom gridline of the title cell needs to be displayed, third title line color data to specify the color of the horizontal bottom gridline of the title cell, fourth title line visibility flag data to specify if the vertical left gridline of the title cell needs to be displayed, fourth title line color data to specify the color of the vertical left gridline of the title cell, fifth title line visibility flag data to specify if the vertical inside gridline of the title cell needs to be displayed, fifth title line color data to specify the color of the vertical inside gridline of the title cell, sixth title line visibility flag data to specify if the vertical right gridline of the title cell needs to be displayed, and sixth title line color data to specify the color of the vertical right gridline of the title cell.

The header cell properties can further include first header line weight data to specify a thickness of a horizontal top gridline of the header cells, second header line weight data to specify a thickness of a horizontal inside gridline of the header cells, third header line weight data to specify a thickness of a horizontal bottom gridline of the header cells, fourth header line weight data to specify a thickness of a vertical left gridline of the header cells, fifth header line weight data to specify a thickness of a vertical inside gridline of the header cells, and sixth header line weight data to specify a thickness of a vertical right gridline of the header cells.

The header cell properties can further include first header line visibility flag data to specify if the horizontal top gridline of the header cells need to be displayed, first header line color data to specify the color of the horizontal top gridline of the header cells, second header line visibility flag data to specify if the horizontal inside gridline of the header cells need to be displayed, second header line color data to specify the color of the horizontal inside gridline of the header cells, third header line visibility flag data to specify if the horizontal bottom gridline of the header cells need to be displayed, third header line color data to specify the color of the horizontal bottom gridline of the header cells, fourth header line visibility flag data to specify if the vertical left gridline of the header cells need to be displayed, fourth header line color data to specify the color of the vertical left gridline of the header cells, fifth header line visibility flag data to specify if the vertical inside gridline of the header cells need to be displayed, fifth header line color data to specify the color of the vertical inside gridline of the header cells, sixth header line visibility flag data to specify if the vertical right gridline of the header cells need to be displayed, and sixth header line color data to specify the color of the vertical right gridline of the header cells.

The data cell properties can further include first data line weight data to specify a thickness of a horizontal top gridline of the data cells, second data line weight data to specify a thickness of a horizontal inside gridline of the data cells, third data line weight data to specify a thickness of a horizontal bottom gridline of the data cells, fourth data line weight data to specify a thickness of a vertical left gridline of the data cells, fifth data line weight data to specify a thickness of a vertical inside gridline of the data cells, and sixth data line weight data to specify a thickness of a vertical right gridline of the data cells.

The data cell properties can further include first data line visibility flag data to specify if the horizontal top gridline of the data cells need to be displayed, first data line color data to specify the color of the horizontal top gridline of the data cells, second data line visibility flag data to specify if the horizontal inside gridline of the data cells need to be displayed, second data line color data to specify the color of the horizontal inside gridline of the data cells, third data line visibility flag data to specify if the horizontal bottom gridline of the data cells need to be displayed, third data line color data to specify the color of the horizontal bottom gridline of the data cells, fourth data line visibility flag data to specify if the vertical left gridline of the data cells need to be displayed, fourth data line color data to specify the color of the vertical left gridline of the data cells, fifth data line visibility flag data to specify if the vertical inside gridline of the data cells need to be displayed, fifth data line color data to specify the color of the vertical inside gridline of the data cells, sixth data line visibility flag data to specify if the vertical right gridline of the data cells need to be displayed, and sixth data line color data to specify the color of the vertical right gridline of the data cells.

The device can be configured to execute a computer aided-design program to read the table style from a file. The device can be configured to execute the computer aided-design program to write the table style to the file. The table style can be stored in a .DWG or a .DXF file.

In general, in another aspect, a method is provided. The method includes receiving an parent class that describes a data structure for a table object in a computer-aided design application, the table object having table elements and cell elements; generating a plurality of fields related to the table and cell elements; and reading a table style having a plurality of properties from a file to populate the plurality of fields.

Particular implementations may include one or more of the following features. The table style can include the table style described above. The file can include the table style described above. The file can be a .DWG or a .DXF file. The method can further include rendering the table object for display in accordance with the table style. The method can further include publishing the table style.

In general, in another aspect, a method is provided. The method can include initiating a dialogue to create a table style; receiving a parent class that describes a data structure for a table style in a computer-aided design program, the table object having table elements and cell elements; generating a plurality of fields related to the table and cell elements; generating a user interface to populate the plurality of fields with properties and data selected by a user; rendering a table object for display in accordance with the table style; and writing a file to store the table style.

Particular implementations may include one or more of the following features. The table style can include the table style described above. The file can include the table style described above. The file can be a .DWG or a .DXF file. Aspects of the invention may offer one or more of the following advantages. A proposed data structure allows table styles to be stored in existing file formats such as .DWG and .DXF (Document eXchange Format).

DRAWINGS

FIG. 1 is a schematic diagram illustrating an exemplary table object associated with a table style.

DETAILED DESCRIPTION

Figure 2:
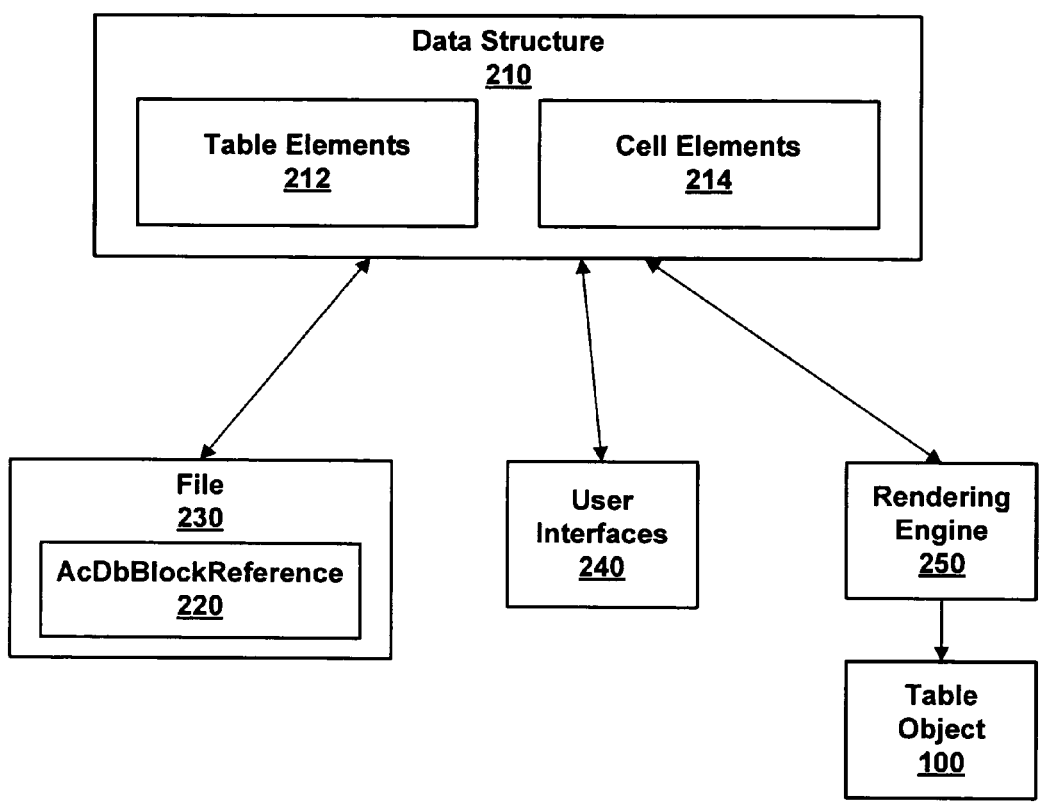
FIG. 2 is a block diagram illustrating a system associated with a table.

A computer-aided design application can display table objects to convey additional information about a drawing. Table objects can be quickly generated by using various table styles. A table style can be a set of properties, or a template, defining various characteristics to be inherited by table objects. The table style can be stored as data in a file using a format described below in association with FIG. 2. The characteristics include graphical representations of a title cell, header cells, and data cells such as the appearance of gridlines and embedded text or block. The characteristics also include a layout of table object such as orientation and flow direction. A default style can be associated with each table object or a user can define one or more custom styles. The table object can be processed by the application, for example, rendered.

FIG. 1 is a schematic diagram illustrating an exemplary a table object 100. Table object 100 includes a title cell 102, header cells 104, and data cells 106.

Title cell 102 can be a cell containing a title as text or a block. As used herein, text generally refers to characters, for example, ASCII characters. Also, blocks generally refer to embedded objects, for example, graphics. In one implementation, title cell 102 of a default is located above header and data cells 104,106 and spans across the columns of table object 100. In other styles, title cell 102 can be located below or beside the columns. Besides the layout of title cell 102, the default style can also define, for example, text properties, cell fill and alignment properties, border properties, and margins. The title can be any name designated by a user or software. For example, the user can choose a title indicative of data displayed in table object 100.

Header cells 104 can be one or more cells containing a header as text or a block. In one implementation, header cells 104 of the default style are located above columns containing subsets of data. In other styles, header cells 104 can be located, for example, above or beside columns. The default style can also define, for example, text properties, cell fill and alignment properties, border properties, and margins. The headers can display any name designated by a user or software. For example, the user can choose a header indicative of the data subset.

Data cells 106 can be one or more cells containing data as text or a block. In one implementation, data cells 106 can be organized by columns or rows to display core information to the user. The default style can also define, for example, text properties, cell fill and alignment properties, border properties, and margins. The data can be information from a database that relates to other subject matter displayed in a computer-generated design. For example, in the AEC (Architecture, Engineering, Construction) industry, table object 100 can comprise a schedule with information about materials needed for constructing a building as drawn. In another example, in the manufacturing industry, table object 100 can comprise a bill of materials with information about parts needed for manufacturing a machine as drawn.

Table object 100 can be implemented in, for example, C++ or other object-oriented environments. Table object 100 can be persistently stored using, for example, a .DWG or a .DXF (Document eXchange Format) file format in a storage device (not shown) such as a hard disk or other magnetic storage, a flash drive, or any other storage device. Table object 100 can be temporarily stored in a volatile storage device (not shown) such as random access memory (RAM). Details associated with formats for persistently and temporarily storing table object 100 are discussed below in association with FIG. 2. Table object 100 can be displayed on a display device (not shown) such as a monitor.

FIG. 2 is a block diagram illustrating a system 200 associated with table object 100. System 200 includes data structure 210, file 230, user interface engine 240, and rendering engine 250. Data structure 210 further includes table elements 212 and cell elements 214. File 230 further includes AcDbBlock-Reference 220.

Data structure 210 is formed by memory locations allocated for specific fields. In the implementation shown, table elements 212 and cell elements 214 are two categories of fields. Table elements include an mTableStyleId field that specifies an ObjectId for a selected style such as the default style. In one implementation, data structure 210 can be initially populated using the table style as a template for table object 100.

An example of particular table elements 212 are listed in Table 1. Each table element 212 includes a name, a data type, and a description for associated data. The name correlates a particular table property with specific data values. For example, names including TitleRow generally describe properties of a TitleRow (e.g., mTitleRowHorzTopVisibility represents visibility characteristics of a grid line located horizontal-top of a title cell). Various names can be substituted for the names listed in Table 1. The data type delimits data bits associated with the name. For example, long integer values can be 32-bits, short integer values can be 16-bits, and Boolean flags can be 1-bit. As a result, a location in memory for retrieving a certain table element 212 can be calculated. For example, a table element 212 can be located by calculating an offset from preceding or succeeding table elements 212. The description denotes a functionality of data. In one implementation, table elements 212 are sequential data fields in data structure 210. In other implementations, some table elements 212 can be omitted, condensed or out-of-order.

TABLE 1

Table Elements

| NAME | DATA TYPE | DESCRIPTION |
| --- | --- | --- |
| mTableBlockRecordId | unsigned long integer value | specify the objectId of the owning block table record that represents the graphic for table object |
| mTableFlags | unsigned short integer value | specify the state of the table object |
| mTableStyleId | unsigned long integer value | (x, y, z) specify the objectId for the referenced table style object |
| mInsertPoint | 3 dimensional point | specify base (top-left) position for the table object |
| mNormal | 3 dimensional vector | (a, b, c) specify the normal direction for table object |
| mHorizDir | 3 dimensional vector | (a, b, c) specify the horizontal direction for table object |
| mNumColumns | unsigned long integer value | specify the total number of columns for table object |
| mNumRows | unsigned long integer value | specify the total number of rows for table object |
| mpColumnWidths[ ] | array of real values | specify the width of individual column for table object |

TABLE 1-continued

Table Elements

| NAME | DATA TYPE | DESCRIPTION |
| --- | --- | --- |
| mpRowHeights[ ] | array of real values | specify the height of individual row for the table object |
| mpLogicalCells[ ] [ ] | two dimensional array | specify cell data. The specification of individual cell data is defined in section 3 of this documentation |
| mHasOverride | Boolean flag | (TRUE or FALSE) specify whether the table object has overrides or not |
| mOverrides | unsigned long integer value | specify general property override bits for table object |
| mTitleSuppressed | Boolean flag | (TRUE or FALSE) flag specify whether the title row is suppressed or not for table object |
| mFlowDirection | short integer value | specify the flow direction (up, down, right, left) for table object. |
| mHorzCellSpace | real value | specify the horizontal cell margin for table object |
| mVertCellSpace | real value | specify the vertical cell margin for table object |
| mTitleRowContentColor | AcCmColor class type | (RGB) specify the color for title row content of the table object |
| mHeaderRowContentColor | AcCmColor class type | (RGB) specify the color for header row content of the table object |
| mDataRowContentColor | AcCmColor class type | (RGB) specify the color for data row content of the table object |
| mTitleRowBackgroundFillNone | Boolean flag | specify whether the title row background fill color is enabled or not |
| mHeaderRowBackgroundFillNone | Boolean flag | specify whether header row background fill color is enabled or not |
| mDataRowBackgroundFillNone | Boolean flag | specify whether data row background fill color is enabled or not |
| mTitleRowBackgroundFillColor | AcCmColor class type | specify the background fill color for title row of the table object |
| mHeaderRowBackgroundFillColor | AcCmColor class type | specify the background fill color for header row of the table object |
| mDataRowBackgroundFillColor | AcCmColor class type | specify the background fill color for data row of table object |
| mTitleRowContentAlignment | short integer value | specify the content alignment type for title row of table object. The feasible types may include top-left, top-center, top-right, middle-left, middle-center, middle-right, bottom-left, bottom-center, bottom-right |
| mHeaderRowContentAlignment | short integer value | specify the content alignment type for header row of table object. The feasible types may include top-left, top-center, top-right, middle-left, middle-center, middle-right, bottom-left, bottom-center, bottom-right |
| mDataRowContentAlignment | short integer value | specify the content alignment type of data row. The feasible types may include top-left, top-center, top-right, middle-left, middle-center, middle-right, bottom-left, bottom-center, bottom-right |
| mTitleRowTextStyleObjectId | unsigned long integer value | specify text style objectId for title row of table object |
| mHeaderRowTextStyleObjectId | unsigned long integer value | specify the text style objectId for header row of table object |
| mDataRowTextStyleObjectId | unsigned long integer value | specify the text style objectId for data row of table object |
| mTitleRowTextHeight | real value | specify the text height for title row of table object |
| mHeaderRowTextHeight | real value | specify the text height for header row of table object |
| mDataRowTextHeight | real value | specify the text height for data row of table object |
| mHasGridColorOverride | Boolean value | specify whether the table object has grid line color override |
| mGridColorOverride | unsigned long integer | value specify grid color override bits for table object |
| mTitleRowHorzTopColor | AcCmColor class type | specify the color for title row horizontal-top grid line of table object |
| mTitleRowHorzInsideColor | AcCmColor class type | specify the color for title row horizontal-inside grid line of the table object |
| mTitleRowHorzBottomColor | AcCmColor class type | specify the color for title row horizontal-bottom grid line of the table object |

TABLE 1-continued

Table Elements

| NAME | DATA TYPE | DESCRIPTION |
| --- | --- | --- |
| mTitleRowVertLeftColor | AcCmColor class type | specify the color for title row vertical-left grid line of the table object |
| mTitleRowVertInsideColor | AcCmColor class type | specify the color for title row vertical-inside grid line of the table object |
| mTitleRowVertRightColor | AcCmColor class type | specify the color for title row vertical-right grid line of the table object |
| mHeaderRowHorzTopColor | AcCmColor class type | specify the color for header row horizontal-top grid line of the table object |
| mHeaderRowHorzInsideColor | AcCmColor class type | specify the color for header row horizontal-inside grid line of the table object |
| mHeaderRowHorzBottomColor | AcCmColor class type | specify the color for header row horizontal-bottom grid line of the table object |
| mHeaderRowVertLeftColor | AcCmColor class type | specify the color for header row vertical-left grid line of the table object |
| mHeaderRowVertInsideColor | AcCmColor class type | specify the color for header row vertical-inside grid line of the table object |
| mHeaderRowVertRightColor | AcCmColor class type | specify the color for header row vertical-right grid line of the table object |
| mDataRowHorzTopColor | AcCmColor class type | specify the color for data row horizontal-top grid line of the table object |
| mDataRowHorzInsideColor | AcCmColor class type | specify the color for data row horizontal-inside grid line of the table object |
| mDataRowHorzBottomColor | AcCmColor class type | specify the color for data row horizontal-bottom grid line of the table object |
| mDataRowVertLeftColor | AcCmColor class type | specify the color for data row vertical-left grid line of the table object |
| mDataRowVertInsideColor | AcCmColor class type | specify the color for data row vertical-inside grid line of the table object |
| mDataRowVertRightColor | AcCmColor class type | specify the color for data row vertical-right grid line of the table object |
| niHasGridLineWeightOverride | Boolean value | specify whether the table object has grid line weight override |
| mGridWeightOverride | unsigned long integer value | specify grid line weight override bits applied at table entity level |
| mTitleRowHorzTopLineWeight | short integer value | specify the line weight for title row horizontal-top grid line of the table object |
| mTitleRowHorzTopLineWeight | short integer value | specify the line weight for title row horizontal-top grid line of the table object |
| mTitleRowHorzInsideLineWeight | short integer value | specify the line weight for title row horizontal-inside grid line of the table object |
| mTitleRowHorzBottomLineWeight | short integer value | specify the line weight for title row horizontal-bottom grid line of the table object |
| mTitleRowVertLeftLineWeight | short integer value | specify the line weight for title row vertical-left grid line of the table object |
| mTitleRowVertInsideLineWeight | short integer value | specify the line weight for title row vertical-inside grid line of the table object |
| mTitleRowVertRightLineWeight | short integer value | specify the line weight for title row vertical-right grid line of the table object |
| mHeaderRowHorzTopLineWeight | short integer value | specify the line weight for header row horizontal-top grid line of the table object |
| mHeaderRowHorzInsideLineWeight | short integer value | specify the line weight for header row horizontal-inside grid line of the table object |
| mHeaderRowHorzBottomLineWeight | short integer value | specify the line weight for header row horizontal-bottom grid line of the table object |
| mHeaderRowVertLeftLineWeight | short integer value | specify the line weight for header row vertical-left grid line of the table object |
| mHeaderRowVertInsideLineWeight | short integer value | a specify the line weight for header row vertical-inside grid line of the table object |
| mHeaderRowVertRightLineWeight | short integer value | value specify the line weight for header row vertical-right grid line of the table object |

TABLE 1-continued

Table Elements

| NAME | DATA TYPE | DESCRIPTION |
| --- | --- | --- |
| mDataRowHorzTopLineWeight | short integer value | specify the line weight for data row horizontal-top grid line of the table object |
| mDataRowHorzInsideLineWeight | short integer value | specify the line weight for data row horizontal-inside grid line of the table object |
| mDataRowHorzBottomLineWeight | short integer value | specify the line weight for data row horizontal-bottom grid line of the table object |
| mDataRowVertLeftLineWeight | short integer value | specify the line weight for data row vertical-left grid line of the table object |
| mDataRowVertInsideLineWeight | short integer value | specify the line weight for data row vertical-inside grid line of the table object |
| mDataRowVertRightLineWeight | short integer value | specify the line weight for data row vertical-right grid line of the table object |
| mHasGridVisibilityOverride | Boolean value | specify whether the table object has grid line visibility override |
| mGridVisibilityOverride | unsigned long integer value | specify grid visibility override bits applied at table entity level |
| mTitleRowHorzTopVisibility | short integer value | specify the visibility for title row horizontal-top grid line of the table object |
| mTitleRowHorzInsideVisibility | short integer value | specify the visibility for title row horizontal-inside grid line of the table object |
| mTitleRowHorzBottomVisibility | short integer value | specify the visibility for title row horizontal-bottom grid line of the table object |
| mTitleRowVertLeftVisibility | short integer value | specify the visibility for title row vertical-left grid line of the table object |
| mTitleRowVertInsideVisibility | short integer value | specify the visibility for title row vertical-inside grid line of the table object |
| mTitleRowVertRightVisibility | short integer value | specify the visibility for title row vertical-right grid line of the table object |
| mHeaderRowHorzTopVisibility | short integer value | specify the visibility for header row horizontal-top grid line of the table object |
| mHeaderRowHorzInsideVisibility | short integer value | specify the visibility for header row horizontal-inside grid line of the table object |
| mHeaderRowHorzBottomVisibility | short integer value | specify the visibility for header row horizontal-bottom grid line of the table object |
| mHeaderRowVertLeftVisibility | short integer value | specify the visibility for header row vertical-left grid line of the table object |
| mHeaderRowVertInsideVisibility | short integer value | specify the visibility for header row vertical-inside grid line of the table object |
| mHeaderRowVertRightVisibility | short integer value | specify the visibility for header row vertical-right grid line of the table object |
| mDataRowHorzTopVisibility | short integer value | specify the visibility for data row horizontal-top grid line of the table object |
| mDataRowHorzInsideVisibility | short integer value | specify the visibility for data row horizontal-inside grid line of the table object |
| mDataRowHorzBottomVisibility | short integer value | specify the visibility for data row horizontal-bottom grid line of the table object |
| mDataRowVertLeftVisibility | short integer value | specify the visibility for data row vertical-left grid line of the table object |
| mDataRowVertInsideVisibility | short integer value | specify the visibility for data row vertical-inside grid line of the table object |
| mDataRowVertRightVisibility | short integer value | specify the visibility for data row vertical-right grid line of the table object |

An example of particular cell elements 214 are listed in Table 2. Each cell element 214 also includes a name, a data type, and a description for associated data.

TABLE 2

Cell Elements

| NAME | DATA TYPE | DESCRIPTION |
| --- | --- | --- |
| mCellType | short integer | specify the cell type. The feasible cell type may include text type or block type |
| mCellFlags | 8 bits short integer value | specify the bit flags for cell |
| mMerged | Boolean value | specify whether the cell is merged or not |
| mAutoFit | Boolean value | specify whether to automatically apply auto fit for the cell |
| mGridWidth | long integer value | specify the width of merged cell |
| mGridHeight | long integer value | specify the height of merged cell |
| mRotation | real value | specify the rotation angle of cell content measured from table horizontal direction |
| mFieldId | unsigned long integer | specify the referenced AcDbField objectId |
| mpTextString | text string | specify text cell content |
| mBlockRecordId | unsigned long integer | specify the referenced AcDbBlockTableRecord objectId representing the block cell content |
| mBlockScale | real value | specify the scale factor for block cell content |
| mHasBlockAttribute | Boolean value | specify whether the block cell has attributes or not |
| mAttDefId | unsigned long integer value | specify the referenced attribute definition objectId |
| mAttDefIndex | short integer value | specify the index for the referenced attribute definition object |
| mpAttValue | text string | specify the content of the referenced attribute object |
| mHasCellOverride | Boolean value | specify whether the cell has override or not |
| mCellOverride | unsigned long integer value | specify the override bits for the table cell |
| mVirtualEdgeFlags | 8 bits integer | specify the virtual edges state |
| mCellAlignment | short integer | specify the content alignment within the cell. The feasible values may include top-left, top-center, top-right, middle-left, middle-center, middle-top, bottom-left, bottom-center, bottom-right. |
| mCellBackgroundFillNone | Boolean value | specify whether to enable the background fill for the cell |
| mCellBackgroundFillColor | AcCmColor class type | specify the color of the background fill for the cell |
| mCellContentColor | AcCmColor class type | specify the color for cell content |
| mCellTextStyleId | unsigned long integer | specify the text style objectId for text string contained in the cell |
| mCellTextHeight | real value | specify the text height for text string contained in the cell |
| mCellTopEdgeColor | AcCmColor class type | specify the color for the top edge of the cell |
| mCellTopEdgeLineWeight | short integer value | specify the line weight for the top edge of the cell |
| mCellTopEdgeVisibility | short integer value | specify the visibility for the top edge of the cell |
| mCellRightEdgeColor | AcCmColor class type | specify the color for the right edge of the cell |
| mCellRightEdgeLineWeight | short integer value | specify the line weight for the right edge of the cell |
| mCellRightEdgeVisibility | short integer value | specify the visibility for the right edge of the cell |
| mCellBottomEdgeColor | AcCmColor class type | specify the color for the bottom edge of the cell |
| mCellBottomEdgeLineWeight | short integer value | specify the line weight for the bottom edge of the cell |
| mCellBottomEdgeVisibility | short integer value | specify the visibility for the bottom edge of the cell |
| mCellLeftEdgeColor | AcCmColor class type | specify the color for the left edge of the cell |
| mCellLeftEdgeLineWeight | short integer value | specify the line weight for the left edge of the cell |
| mCellLeftEdgeVisibility | short integer value | specify the visibility for the left edge of the cell |

File 230 can be a database or other persistent data structure using various formats to store data such as .DWG or .DXF. In one implementation, file 230 stores data from Tables 1 and 2 in sequential order, for example, as a continuous string, separated by commas, in tabular format, or the like. Data is read or filed out to data structure 210 when loading file 230. Data is written or filed in from data structure 210 when creating or updating file 230. File 230 can also store databases associated with table object 100 which refers to a table style. In some implementations, there are variations between the file format and specific implementation of Tables 1 and 2. For example, a DXF file can use an unsigned integer data type for mTableStyleId.

AcDbBlockReference 220 can be a parent class, parent object, metadata or other listing of object properties associated with objects including table object 100. In one implementation, AcDbBlockReference 220 lists specific fields contained within data structure 210 along with data types. That is, AcDbBlockReference 220 generates a structure or shell for temporary storage of data associated with table object 100 that is compatible with a software program attempting to display table object 100. In one implementation, AcDbBlockReference 220 generates a structure for the table style as a subset of a structure needed for table object 100 (i.e., table object 100 has more properties than the table style and also has data populating cells).

User interface engine 240 is in communication with data structure 210 to read and write table and cell elements 212, 214. User interface engine 240 can display windows, dialog boxes, lists, or any other interface capable of displaying properties and receiving user selections. The user can interact with user interface engine 240 using, for example, a keyboard, mouse, electronic pad and the like.

Rendering engine 250 receives and processes information from data structure 210. Rendering engine 250 can be a graphical engine implemented in hardware and/or software. Rendering engine 250 processes received information to generate a graphical representation of table object 100. In one implementation, rendering engine 250 draws grid lines to form cells. For example, mNormal describes a normal direction that is perpendicular to a plane of table object 100 (e.g., according to x, y, and z-axis coordinates) and mHorizDir describes a horizontal direction or angle. Rendering engine 250 also populates cells as indicated by elements of data structure 210.

Figure 3A:
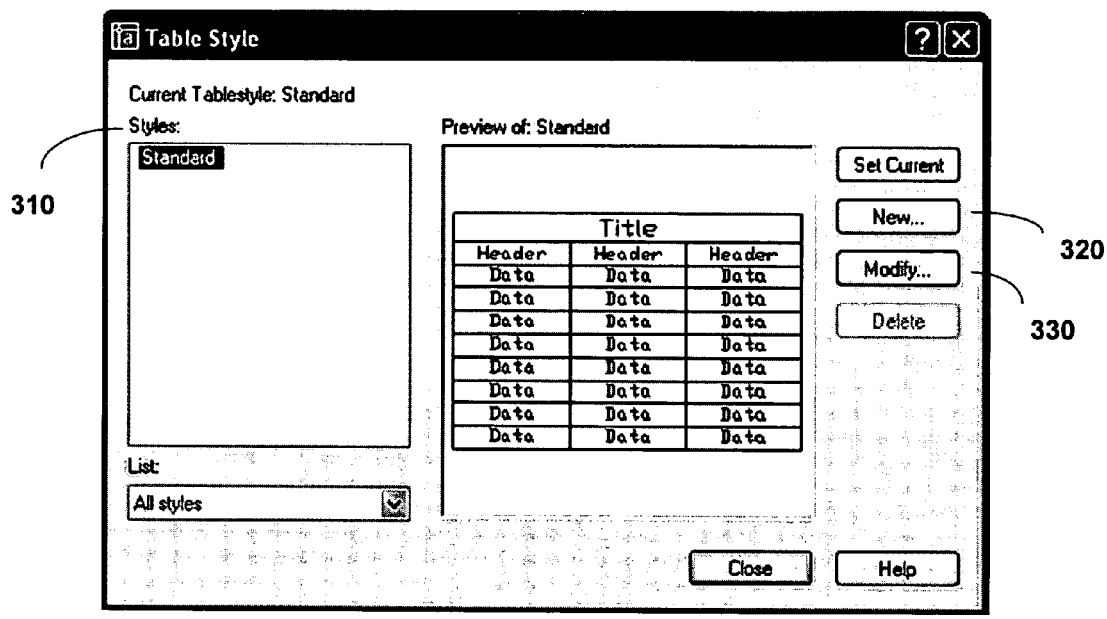
FIG. 3A is a schematic diagram illustrating a first user interface for selecting a table style.

FIG. 3A is a schematic diagram illustrating a first user interface 300 for selecting a table style. First user interface 300 includes a styles list 310, new button 320 and a modify button 330. In one implementation, first user interface 300 is the beginning of a dialogue displayed responsive to a selection from a drop-down menu.

Styles list 310 can be a delineation of available styles. The delineation can include preconfigured and previously customized styles. In one implementation, a user can select a style in style list 310 to preview a table based on associated properties and data.

New button 320 can be an object, graphical image or the like. In one implementation, new button 320 permits a user to create a new table style with custom properties and data as described in more detail below. Once a new style is created, the new style will be listed in style list 310.

Modify button 330 can be an object, graphical image or the like. In one implementation, modify button 320 permits a user to change an existing table style to have different properties and data.

Figure 3B:
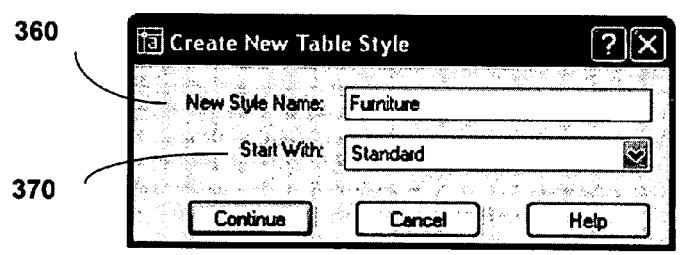
FIG. 3B is a schematic diagram illustrating a second user interface for creating a table style.

FIG. 3B is a schematic diagram illustrating a second user interface 350 for creating a table style. Second user interface 350 includes a new table style name window 360 and a start with window 370. In one implementation, second user interface 350 is displayed responsive to a selection of new button 320 of FIG. 3A.

New style name window 360 can be an object, text box or the like. In one implementation, a user can enter text to assign a name to the custom style. The name can be a genre, title name, or other abstraction of data used to populate the table.

Start with window 370 can be an object, drop down list or the like. In one implementation, a user can select or change an existing table style from which to modify properties and data (the existing table style can serve as a baseline of properties for the new style).

Figure 4:
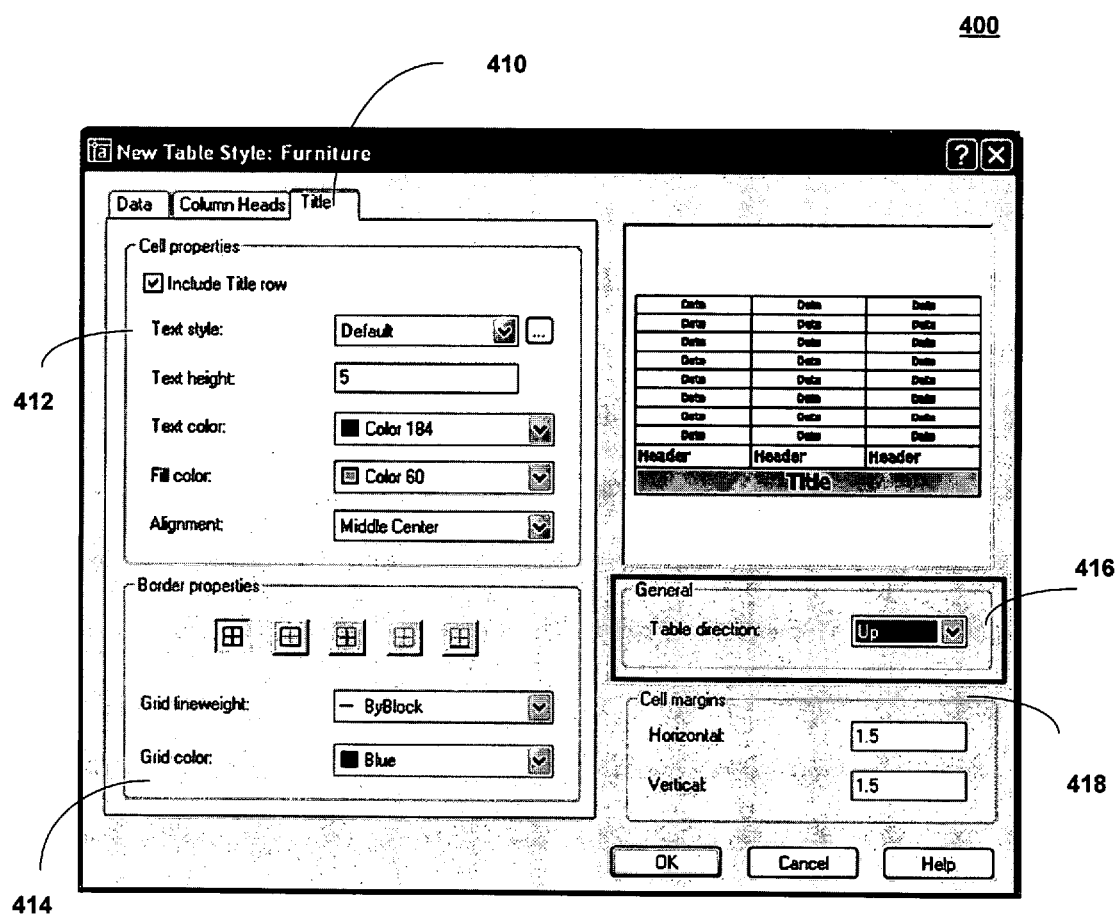
FIG. 4 is a schematic diagram illustrating a third user interface for defining a title cell of a table style.

FIG. 4 is a schematic diagram illustrating a third user interface 400 for defining title cell 102 of a table style. Third user interface 400 includes a title tab 410, a cell properties section 412, a border properties section 414, a general section 416, and a cell margins section 418. In one implementation, third user interface 400 is displayed responsive to a user entering selections in second user interface 350 of FIG. 3B or to selecting title tab 410 from within third user interface 400.

Cell properties section 412 allow a user to control various properties associated with a title cell of a new style. In one implementation, configurable properties include text style, text height, text color, fill color and text alignment for the title cell. Selections of various properties are reflected in data structures associated with the created style. For example, a selection of text style sets mTitleRowTextStyleObjectId; a selection of text height sets mTitleRowTextHeight; a selection of text color sets mTitleRowContentColor and a selection of fill color sets mTitleRowBackgroundFillColor. An indication of whether the title row should be included in the table style sets an mTitleSupprssed flag to TRUE or FALSE.

Border properties section 414 allows a user to control various properties associated with borders of the title cell. In one implementation, configurable properties include which borders have visible borders, grid lineweight and grid color. For example, a selection of border visibility sets mTitleRowHorzTopVisibility among others; a selection of grid lineweight sets mTitleRowVertInsideLineWeight among others; and a selection of grid color sets mTitleRowVertLeftColor.

General section 416 allows a user to control, for example, a table direction. In FIG. 4, the table direction is up, resulting in a title cell at the bottom of the table and header and data cells above the title cell. If the table direction is down, the title cell is placed at the top of the table and header and data cells are below the title cell. In one implementation, the table direction sets mFlowDirection.

Cell margins section 418 specifies spacing between gridlines of a cell and inserted text or blocks. In one implementation, both horizontal and vertical cell margins for the entire table can be specified by a user. For example, a selection of horizontal cell margins sets mHorzCellSpace and a selection of vertical cell margins sets mVertCellSpace. In another implementation, horizontal and vertical cell margins are specified at different levels of granularity, for example, only for the title cell.

Figure 5:
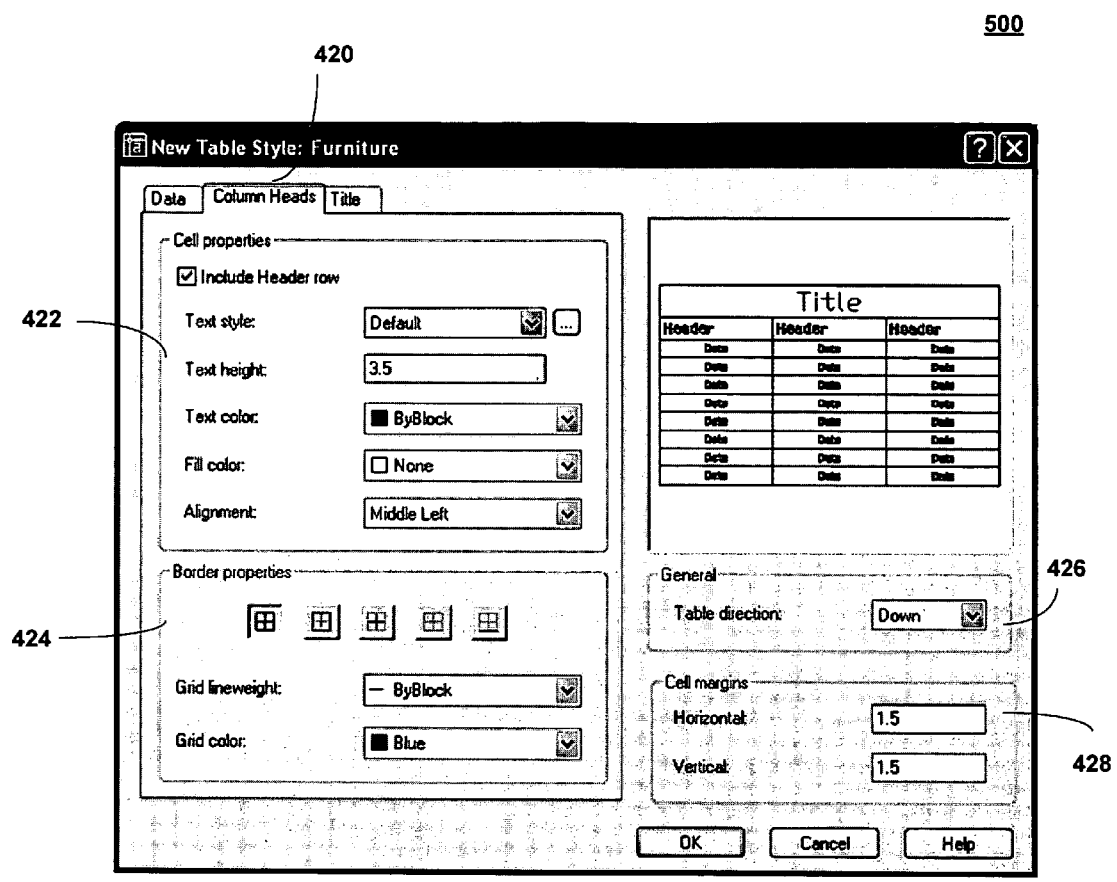
FIG. 5 is a schematic diagram illustrating a fourth user interface for defining header cells of a table style

FIG. 5 is a schematic diagram illustrating a fourth user interface 500 for defining header cells 104 of a table style. Column header tab 420 further includes a cell properties section 422, a border properties section 424, a general section 426, and a cell margins section 428.

Cell properties section 422, border properties section 424, general section 426, and cell margins section 428 are functionally similar to like named sections described above in association with FIG. 4. However, the properties are set with respect to header cells. For example, text style of cell properties section 422 in FIG. 5 sets mHeaderRowTextStyleObjectId.

Figure 6:
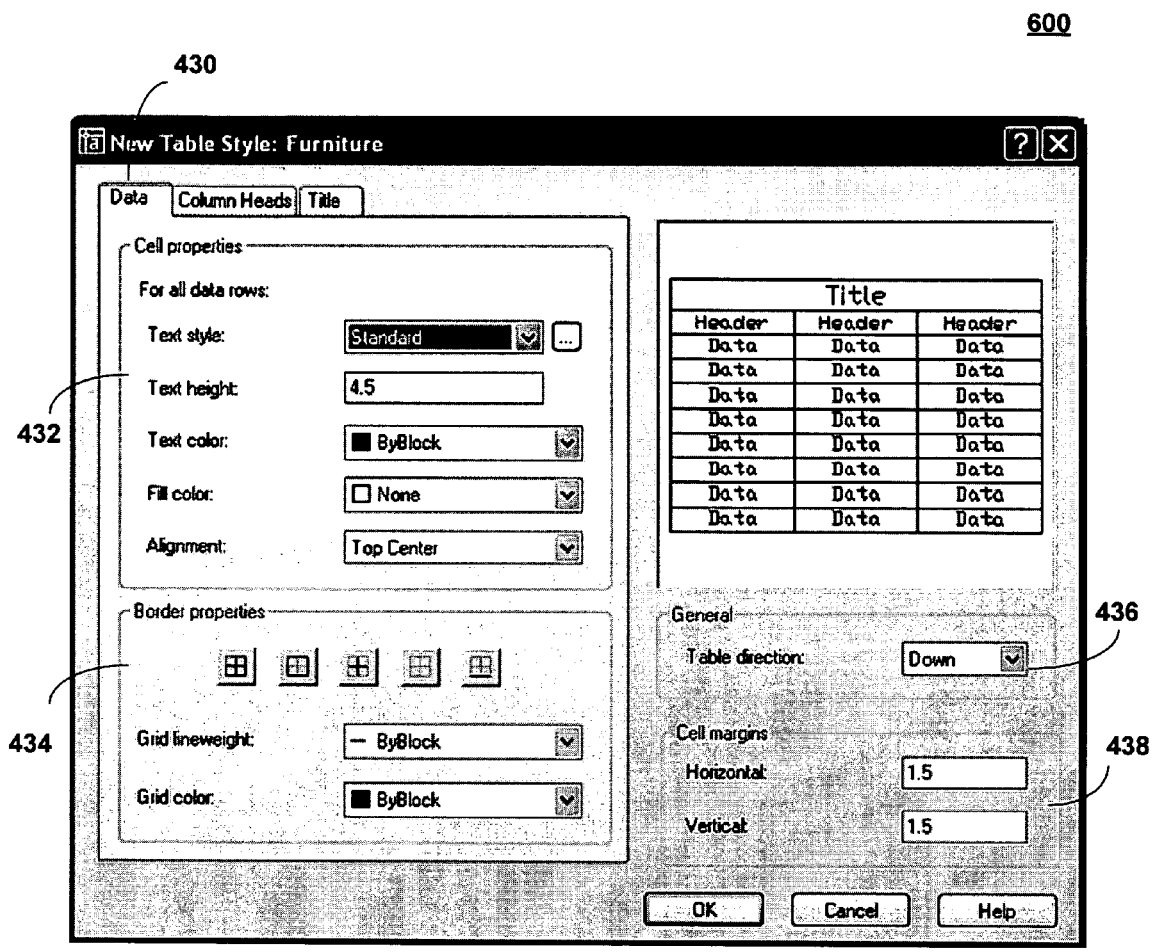
FIG. 6 is a schematic diagram illustrating a fifth user interface for defining data cells of a table style.

FIG. 6 is a schematic diagram illustrating fifth user interface 600 for defining data cells 106 of a table style. Data tab 430 further includes a cell properties section 432, a border properties section 434, a general section 436, and a cell margins section 438

Sections of like names to FIG. 4 are functionally similar, however, the fifth user interface 600 is used to set properties are set with respect to data cells. For example, text style of cell properties section 432 in FIG. 6 sets mDataRowTextStyleObjectId.

Figure 7:
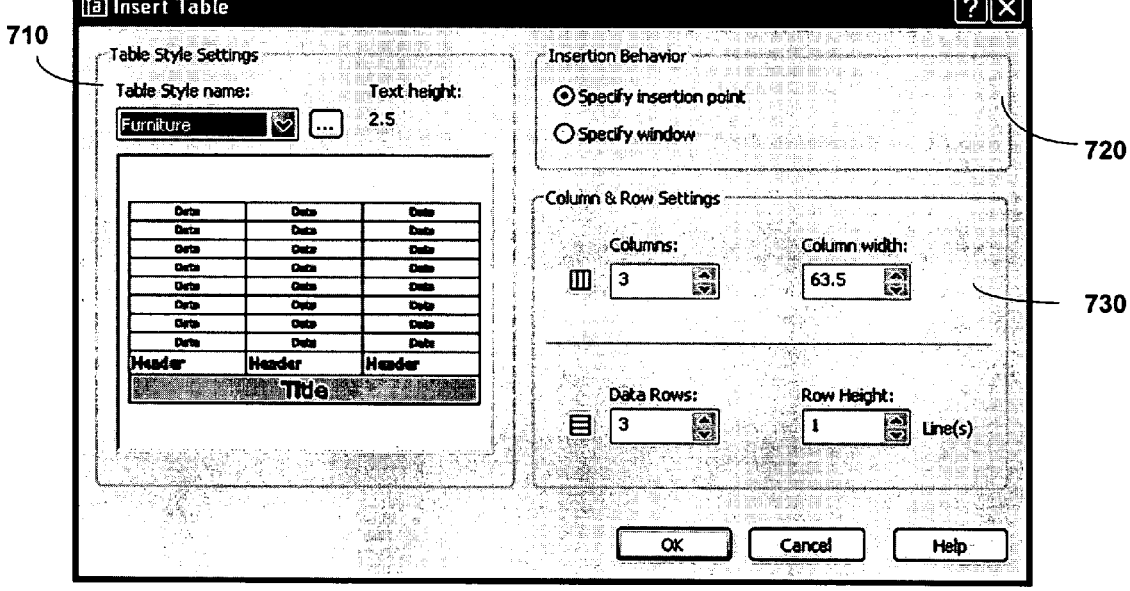
FIG. 7 is a schematic diagram illustrating a sixth user interface for inserting a table object.

FIG. 7 is a schematic diagram illustrating a sixth user interface 700 for creating or inserting table object 100. Sixth user interface 700 includes table style settings 710, insertion behavior settings 720, and column and row settings 730.

Table style settings 710 allow the user to browse preconfigured (e.g., standard) or customized settings that automatically populate properties of a table. Selected styles appear in a preview pane for visual indications of properties. In the example style of FIG. 7, an objectId is associated with a standard style (i.e., mTableStyleId is set to an unsigned long integer value identifying standard).

Insertion behavior settings 720 allow the user to specify placement properties of a table. In one implementation, selection of an insertion point for the table is activated. Accordingly, a location containing x, y, and z coordinates defines, for example, an upper left corner of the table (i.e., mInsertionPoint is designated). Additionally, selection of a specific window is provided.

Column and row settings 730 determine a number and a size of cells to be included in the table. As shown in the example of FIG. 7, a variable number of columns having a variable width can be set (i.e., mNumColumns and mpColumnWidths[ ] are set). Also, a variable number of rows having variable height can be set (i.e., mNumRows and mpRowHeights[ ] are set).

Figure 8:
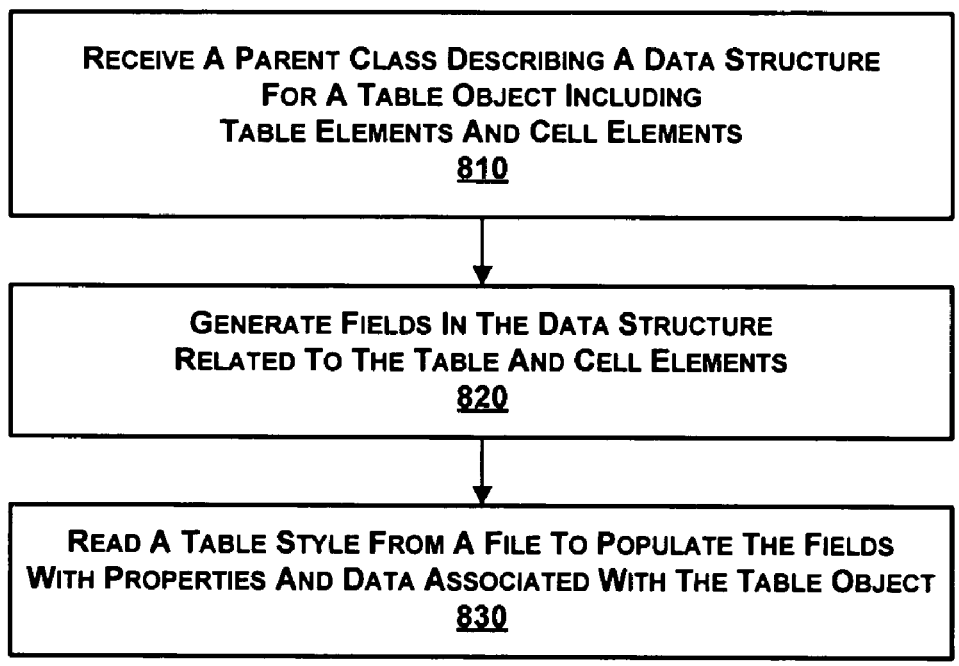
FIG. 8 is a flow diagram illustrating a method for processing formatted data associated with a table style.

FIG. 8 is a flow diagram illustrating a method 800 for processing formatted data associated with a table style. A parent class (e.g., AcDbBlockReference 220) is received that describes a data structure for a table object 810 (e.g., for table object 100 by data structure 210). The table object includes table elements and cell elements (e.g., table elements 212 and cell elements 214). Fields are generated in the data structure related to the table and cell elements 820. A table style is read from a file (e.g., a preconfigured or custom style from file 230 which can be in a .DWG or .DXF format) to populate the fields with properties and data associated with the table object 830.

Figure 9:
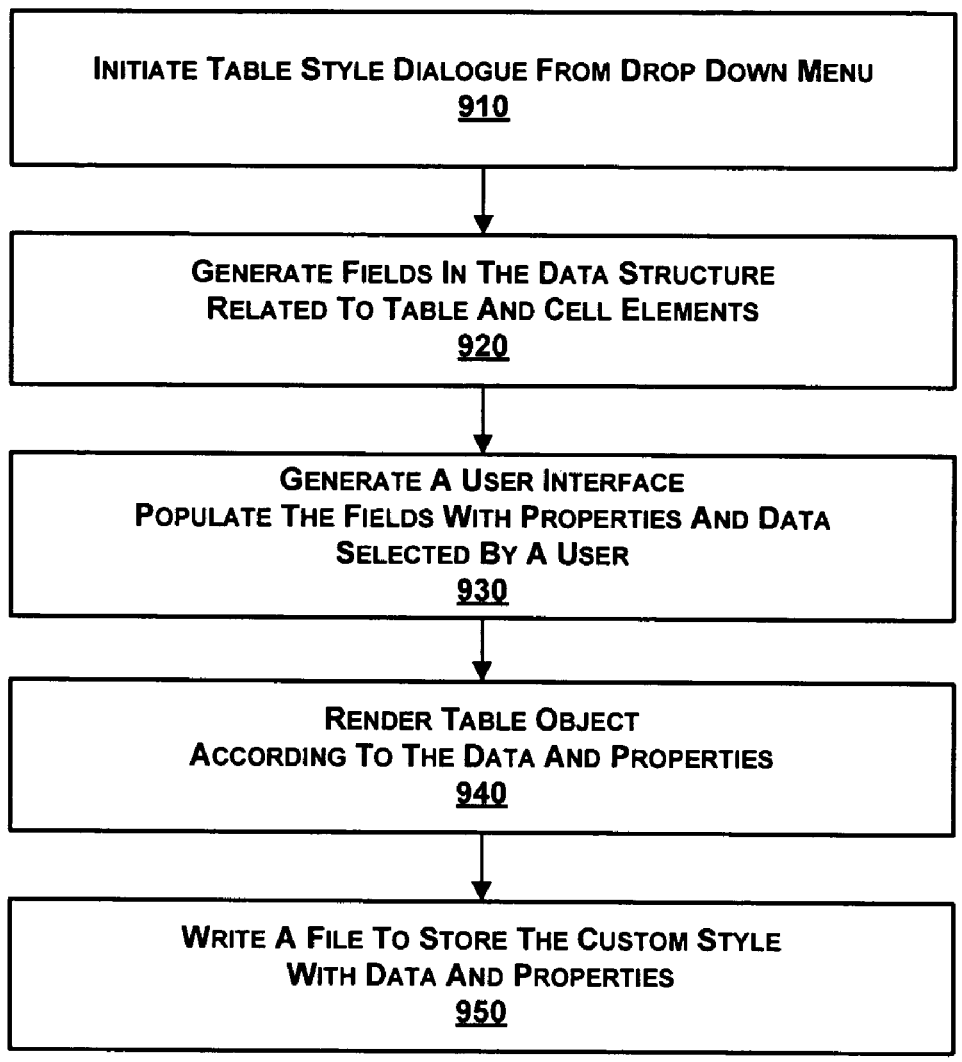
FIG. 9 is a flow diagram illustrating a method for creating formatted data associated with a table style.

FIG. 9 is a flow diagram illustrating a method 900 for creating formatted data associated with a table style. The table style dialogue is initiated, for example, from a drop down menu 910. Fields are generated in the data structure related to table and cell elements 920. A user interface (e.g., first through sixth user interfaces 300,350,400-700) is generated to allow for population of the fields with properties and data selected by a user. The user interface can be used for selecting the table style, creating the table style, defining title, header and data cells, and inserting the table object. The table object is rendered according to the data and properties 940 (e.g., by rendering engine 250). The file is written to store the style with data and properties 950. In other implementations, additional processing steps are possible, for example, publishing the table style.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network.

Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A system comprising:
   a device to persistently store a table style, the table style specifying properties inherited by a table object displayed in a computer-aided design application, the table object including a title cell, header cells and data cells that each have properties and data, the table style including:
   an identifier to identify the table style that designates properties associated with the table object;
   a flow direction designator to specify which direction the table object is organized;
   horizontal spacing data to specify spacing between horizontal gridlines of the table object and embedded data;
   vertical spacing data to specify spacing between vertical gridlines of the table object and the embedded data;
   a first suppression flag to indicate whether the title cell is displayed in the table object;
   a second suppression flag to indicate whether the header cells are displayed in the table object;
   header cell properties to specify properties associated with each header cell;
   data cell properties to specify properties associated with each data cell;
   title cell properties to specify properties associated with the title cell where the title cell properties comprise:
   first title line weight data to specify a thickness of a horizontal top gridline of the title cell;
   second title line weight data to specify a thickness of a horizontal inside gridline of the title cell;
   third title line weight data to specify a thickness of a horizontal bottom gridline of the title cell;
   fourth title line weight data to specify a thickness of a vertical left gridline of the title cell;
   fifth title line weight data to specify a thickness of a vertical inside gridline of the title cell; and
   sixth title line weight data to specify a thickness of a vertical right gridline of the title cell.

2. A system comprising:
   a device to persistently store a table style, the table style specifying properties inherited by a table object displayed in a computer-aided design application, the table object including a title cell, header cells and data cells that each have properties and data, the table style including:
   an identifier to identify the table style that designates properties associated with the table object;
   a flow direction designator to specify which direction the table object is organized;
   horizontal spacing data to specify spacing between horizontal gridlines of the table object and embedded data;
   vertical spacing data to specify spacing between vertical grid lines of the table object and the embedded data;
   a first suppression flag to indicate whether the title cell is displayed in the table object;
   a second suppression flag to indicate whether the header cells are displayed in the table object;
   header cell properties to specify properties associated with each header cell;
   data cell properties to specify properties associated with each data cell;
   title cell properties to specify properties associated with the title cell where the title cell properties comprise:
   first title line visibility flag data to specify if the horizontal top gridline of the title cell needs to be displayed;
   first title line color data to specify the color of the horizontal top gridline of the title cell;
   second title line visibility flag data to specify if the horizontal inside gridline of the title cell needs to be displayed;
   second title line color data to specify the color of the horizontal inside gridline of the title cell;
   third title line visibility flag data to specify if the horizontal bottom gridline of the title cell needs to be displayed;
   third title line color data to specify the color of the horizontal bottom gridline of the title cell;
   fourth title line visibility flag data to specify if the vertical left gridline of the title cell needs to be displayed;
   fourth title line color data to specify the color of the vertical left gridline of the title cell;
   fifth title line visibility flag data to specify if the vertical inside gridline of the title cell needs to be displayed;
   fifth title line color data to specify the color of the vertical inside gridline of the title cell;
   sixth title line visibility flag data to specify if the vertical right gridline of the title cell needs to be displayed; and
   sixth title line color data to specify the color of the vertical right gridline of the title cell.

3. A system comprising:
   a device to persistently store a table style, the table style specifying properties inherited by a table object displayed in a computer-aided design application, the table object including a title cell, header cells and data cells that each have properties and data, the table style including:
   an identifier to identify the table style that designates properties associated with the table object;
   a flow direction designator to specify which direction the table object is organized;
   horizontal spacing data to specify spacing between horizontal gridlines of the table object and embedded data;
   vertical spacing data to specify spacing between vertical grid lines of the table object and the embedded data;
   a first suppression flag to indicate whether the title cell is displayed in the table object;
   a second suppression flag to indicate whether the header cells are displayed in the table object;
   title cell properties to specify properties associated with the title cell;
   data cell properties to specify properties associated with each data cell;
   header cell properties to specify properties associated with each header cell where the header cell properties comprise:
   first header line weight data to specify a thickness of a horizontal top gridline of the header cells;
   second header line weight data to specify a thickness of a horizontal inside gridline of the header cells;
   third header line weight data to specify a thickness of a horizontal bottom gridline of the header cells;

fourth header line weight data to specify a thickness of a vertical left gridline of the header cells;
fifth header line weight data to specify a thickness of a vertical inside gridline of the Header cells; and
sixth header line weight data to specify a thickness of a vertical right gridline of the header cells.

4. A system comprising:
a device to persistently store a table style, the table style specifying properties inherited by a table object displayed in a computer-aided design application, the table object including a title cell, header cells and data cells that each have properties and data, the table style including:
an identifier to identify the table style that designates properties associated with the table object;
a flow direction designator to specify which direction the table object is organized;
horizontal spacing data to specify spacing between horizontal gridlines of the table object and embedded data;
vertical spacing data to specify spacing between vertical grid lines of the table object and the embedded data;
a first suppression flag to indicate whether the title cell is displayed in the table object;
a second suppression flag to indicate whether the header cells are displayed in the table object;
title cell properties to specify properties associated with the title cell;
data cell properties to specify properties associated with each data cell;
header cell properties to specify properties associated with each header cell where the header cell properties comprise:
first header line visibility flag data to specify if the horizontal top gridline of the header cells need to be displayed;
first header line color data to specify the color of the horizontal top gridline of the header cells;
second header line visibility flag data to specify if the horizontal inside gridline of the header cells need to be displayed;
second header line color data to specify the color of the horizontal inside gridline of the header cells;
third header line visibility flag data to specify if the horizontal bottom gridline of the header cells need to be displayed;
third header line color data to specify the color of the horizontal bottom gridline of the header cells;
fourth header line visibility flag data to specify if the vertical left gridline of the header cells need to be displayed;
fourth header line color data to specify the color of the vertical left gridline of the header cells;
fifth header line visibility flag data to specify if the vertical inside gridline of the header cells need to be displayed;
fifth header line color data to specify the color of the vertical inside gridline of the header cells;
sixth header line visibility flag data to specify if the vertical right gridline of the header cells need to be displayed; and
sixth header line color data to specify the color of the vertical right gridline of the header cells.

5. A system comprising:
a device to persistently store a table style, the table style specifying properties inherited by a table object displayed in a computer-aided design application, the table object including a title cell, header cells and data cells that each have properties and data, the table style including:
an identifier to identify the table style that designates properties associated with the table object;
a flow direction designator to specify which direction the table object is organized;
horizontal spacing data to specify spacing between horizontal gridlines of the table object and embedded data;
vertical spacing data to specify spacing between vertical grid lines of the table object and the embedded data;
a first suppression flag to indicate whether the title cell is displayed in the table object;
a second suppression flag to indicate whether the header cells are displayed in the table object;
title cell properties to specify properties associated with the title cell;
header cell properties to specify properties associated with each header cell;
data cell properties to specify properties associated with each data cell where the data cell properties comprise:
first data line weight data to specify a thickness of a horizontal top gridline of the data cells;
second data line weight data to specify a thickness of a horizontal inside gridline of the data cells;
third data line weight data to specify a thickness of a horizontal bottom gridline of the data cells;
fourth data line weight data to specify a thickness of a vertical left gridline of the data cells;
fifth data line weight data to specify a thickness of a vertical inside gridline of the data cells; and
sixth data line weight data to specify a thickness of a vertical right gridline of the data cells.

6. A system comprising:
a device to persistently store a table style, the table style specifying properties inherited by a table object displayed in a computer-aided design application, the table object including a title cell, header cells and data cells that each have properties and data, the table style including:
an identifier to identify the table style that designates properties associated with the table object;
a flow direction designator to specify which direction the table object is organized;
horizontal spacing data to specify spacing between horizontal gridlines of the table object and embedded data;
vertical spacing data to specify spacing between vertical grid lines of the table object and the embedded data;
a first suppression flag to indicate whether the title cell is displayed in the table object;
a second suppression flag to indicate whether the header cells are displayed in the table object;
title cell properties to specify properties associated with the title cell;
header cell properties to specify properties associated with each header cell;
data cell properties to specify properties associated with each data cell where the data cell properties comprise:
first data line visibility flag data to specify if the horizontal top gridline of the data cells need to be displayed;
first data line color data to specify the color of the horizontal top gridline of the data cells;
second data line visibility flag data to specify if the horizontal inside gridline of the data cells need to be displayed;
second data line color data to specify the color of the horizontal inside gridline of the data cells;
third data line visibility flag data to specify if the horizontal bottom gridline of the data cells need to be displayed;

third data line color data to specify the color of the horizontal bottom gridline of the data cells;

fourth data line visibility flag data to specify if the vertical left gridline of the data cells need to be displayed;

fourth data line color data to specify the color of the vertical left gridline of the data cells;

fifth data line visibility flag data to specify if the vertical inside gridline of the data cells need to be displayed;

fifth data line color data to specify the color of the vertical inside gridline of the data cells;

sixth data line visibility flag data to specify if the vertical right gridline of the data cells need to be displayed; and sixth data line color data to specify the color of the vertical right gridline of the data cells.

* * * * *

UNITED STATES PATENT AND TRADEMARK OFFICE
CERTIFICATE OF CORRECTION

| | |
|---|---|
| PATENT NO. | : 7,526,719 B1 |
| APPLICATION NO. | : 11/086805 |
| DATED | : April 28, 2009 |
| INVENTOR(S) | : Gopalakrishnan |

Page 1 of 1

It is certified that error appears in the above-identified patent and that said Letters Patent is hereby corrected as shown below:

In column 19, line 67, in claim 2, delete "grid lines" and insert -- gridlines --, therefor.

In column 20, line 50, in claim 3, delete "grid lines" and insert -- gridlines --, therefor.

In column 21, line 4, in claim 3, delete "Header" and insert -- header --, therefor.

In column 21, line 21, in claim 4, delete "grid lines" and insert -- gridlines --, therefor.

In column 22, line 8, in claim 5, delete "grid lines" and insert -- gridlines --, therefor.

In column 22, line 45, in claim 6, delete "grid lines" and insert -- gridlines --, therefor.

Signed and Sealed this

Fourteenth Day of July, 2009

JOHN DOLL
*Acting Director of the United States Patent and Trademark Office*